United States Patent Office 2,840,518
Patented June 24, 1958

2,840,518

ACID COPPER ADDITION AGENTS AND PLATING ELECTROLYTES EMBODYING THE SAME

James W. Condon, Pittsburgh, Pa., assignor to Westinghouse Electric Corporation, East Pittsburgh, Pa., a corporation of Pennsylvania No Drawing. Application July 19, 1954
Serial No. 444,387

8 Claims. (Cl. 204—52)

This invention relates to the electrodeposition of copper from electrolytes embodying certain addition agents to promote brighter and smoother plating.

An object of this invention is to provide an improved acid copper electrolyte in which there is incorporated as a brightener an essential ingredient comprising yeast protein autolysate.

A further object of this invention is to provide a method for electroplating copper from an acid copper electrolyte containing as an essential ingredient yeast protein autolysate.

A further object of this invention is to provide a method for electroplating copper from an acid copper electrolyte containing as an essential ingredient yeast protein autolysate and in which there also may be added, if desired, at least one soluble compound having the thiourea nucleus:

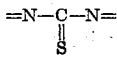

or a starch saccharifying enzyme, or both.

Other objects of the invention will, in part, be obvious and will, in part, appear hereinafter.

For a better understanding of the nature and objects of the invention, reference should be had to the following detailed description.

I have discovered that the addition of yeast protein autolysate to acid copper electrolytes will enable electrodeposits having highly smooth, bright surfaces to be plated from the electrolyte so treated. Also, it has been discovered that the further addition of at least one soluble compound having the thiourea nucleus:

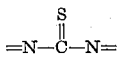

or a starch saccharifying enzyme, or both, will result in added improvements in the copper deposits.

More particularly, the present invention is based on the addition of from 0.005 to 0.2 ounce of yeast protein autolysate per gallon of acid copper electrolyte. Yeast protein autolysate is readily available to the trade. It is a yeast protein digest prepared from primary yeast by the action of those proteolytic enzymes naturally present in fresh yeast. The yeast protein autolysate comprises a highly concentrated source of soluble nitrogen compounds comprising amino acids, dipeptides, polypeptides and simple combinations of these. An example of yeast protein autolysate available to the trade is under the trade name of Basamin-Busch, manufactured by Anheuser-Busch, Inc. It is also available from other sources.

The starch saccharifying enzyme may be added with the yeast protein autolysate in an amount of from 0.003 to 0.2 ounce per gallon of the acid copper electrolyte. An example of the preparation of a suitable starch saccharifying enzyme may be found in Patent No. 2,676,905.

The compounds having the thiourea nucleus may be added in combination with either the yeast protein autolysate, or with the yeast protein autolysate and starch saccharifying enzyme. The amount of such compound used is from 0.0005 to 0.015 ounce per gallon of electrolyte. Suitable compounds having the thiourea nucleus:

may be aliphatic or cyclic compounds, such as the following thiohydantoin nucleus:

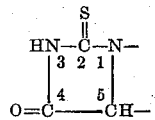

Various organic radicals or hydrogen may be substituted at any one of the available positions in the base nucleus or the cyclic thiohydantoin nucleus so long as the compound is not rendered insoluble so that it will not dissolve in the aqueous acid copper electrolyte in an amount sufficient to produce an appreciable result. Examples of suitable compounds are:

Thiourea
Acetyl thiourea
2-thiohydantoin
1-acetyl-2-thiohydantoin
5(2-hydroxylbenzal)-2-thiohydantoin
5-furfural-2-thiohydantoin
1-benzoyl-2-thiohydantoin
5-benzal-2-thiohydantoin
1-methyl-2-thiohydantoin The best results have been secured with 2-thiohydantoin derivatives having a carbonyl group

attached at any one or both of the 1 and 5 positions, and with an organic radical being attached to the carbonyl group.

Acid copper electrolytes suitable for plating copper are well known. Any of these may be treated with the addition agents of this invention with improved plating therefrom following. A suitable acid copper electrolyte is one comprising an aqueous solution having dissolved therein from 20 to 33 ounces per gallon of copper sulfate and from 1.3 to 13 ounces per gallon of sulfuric acid. In industry at the present time, the acid copper bath most widely used is one comprising a solution of approximately 27.5 ounces per gallon of copper sulfate crystals and approximately 8 ounces per gallon of sulfuric acid (98%).

It will be appreciated that as the electrolyte is used in plating, the addition agents will require replenishing from time to time. As is well known, the optimum operating temperature of bright acid copper plating baths having addition agents therein is from substantially 65 to 70° F. With the addition agents of this invention, however, the baths may be operated at temperatures from 65° F. up to 105° F. and even higher with excellent results.

Acid copper aqueous electroplating electrolytes with the addition agents of this invention may be employed for plating copper on a metallic base member, by passing either continuous or interrupted direct current, superimposed alternating current and direct current, or periodically reversed electrical current of other suitable electrical current therethrough. Excellent results have been obtained with direct current plating from such electrolytes. It will be understood that other addition agents may be present in the electrolyte.

The following examples are illustrative of the practice of the present invention:

Example I

An aqueous electrolyte of the following composition was prepared:

| | Oz. per gal. |
|---|---|
| Copper sulfate (crystals) $CuSO_4 \cdot 5H_2O$ | 28 |
| Sulfuric acid (98%) | 8 |
| Yeast protein autolysate | 0.05 |

The yeast protein autolysate is readily soluble in lukewarm water. Additions were made to the bath using this procedure. No precipitation occurred upon adding the yeast protein autolysate water mixture to the acid copper bath. This bath was operated at a temperature of 85° F. by passing direct current therethrough to plate copper on a metallic base member. Air agitation was used. It is to be understood, of course, that the bath may be agitated by other means such as cathode rocking. The current density was from 5 to 100 amps per square foot at the cathode. The copper plated on the metallic member was quite ductile at the current density range of from 50 to 100 amps. per square foot. The deposit was a semi-bright copper which was easily buffed with only a brief wiping action. The throwing power of this electrolyte was considerably above average for acid baths.

Example II

An aqueous electrolyte of the following composition was prepared:

| | Oz. per gal. |
|---|---|
| Copper sulfate (crystals) $CuSO_4 \cdot 5H_2O$ | 28 |
| Sulfuric acid (98%) | 8 |
| Yeast protein autolysate | 0.15 |
| Starch saccharifying enzyme | 0.100 |

Copper was plated on a metallic base member in the same manner and under the same operating conditions as described in Example I. There was good color throughout the semibright entire range of from 5 to 100 amperes per square foot with no streaking or ribbing. Excellent ductility was obtained of the same order as results from addition free baths. The throwing power was superior to that of either acid copper baths having no addition agents, or any other acid copper plating baths heretofore known.

Example III

An aqueous electrolyte of the following composition was prepared:

| | Oz. per gal. |
|---|---|
| Copper sulfate (crystals) $CuSO_4 \cdot 5H_2O$ | 28 |
| Sulfuric acid (98%) | 8 |
| Yeast protein autolysate | 0.050 |
| 1-acetyl-2-thiohydantoin | 0.004 |

This bath was used to plate copper under the same operating conditions as described in Example I but at a temperature of 80° F. The copper deposits were of sufficient color and brightness that no buffing was required prior to nickel and chromium plating.

Example IV

An aqueous electrolyte of the following composition was prepared:

| | Oz. per gal. |
|---|---|
| Copper sulfate (crystals) $CuSO_4 \cdot 5H_2O$ | 28 |
| Sulfuric acid (98%) | 8 |
| Yeast protein autolysate | 0.150 |
| 1-acetyl-2-thiohydantoin | 0.004 |
| Starch saccharifying enzyme | 0.100 |

This bath was operated under the same conditions as described in Example I but at a temperature of 90° F. The same good results were obtained as in Example I, but the addition of the starch saccharifying enzyme allowed full bright deposits at the higher temperature. Temperatures above 80° F. usually have a dulling effect on the copper deposits from conventional acid copper baths having other addition agents present.

Example V

An aqueous electrolyte of the following composition was prepared:

| | Oz. per gal. |
|---|---|
| Copper sulfate (crystals) $CuSO_4 \cdot 5H_2O$ | 28 |
| Sulfuric acid (98%) | 8 |
| Yeast protein autolysate | 0.150 |
| Starch saccharifying enzyme | 0.10 |
| Acetyl thiourea | 0.003 |

This bath was operated under the same conditions as described in Example I. The bath showed excellent throwing power, and the copper deposits were very bright with good ductility.

Example VI

An aqueous electrolyte of the following composition was prepared:

| | Oz. per gal. |
|---|---|
| Copper sulfate (crystals) $CuSO_4 \cdot 5H_2O$ | 28 |
| Sulfuric acid (98%) | 8 |
| Yeast protein autolysate | 0.025 |
| Starch saccharifying enzyme | 0.10 |
| Thiourea | 0.001 |

This bath was operated under the same conditions as Example I. Excellent copper plating was obtained, the color and brightness in this case being slightly better than in Example III which included 1-acetyl-2-thiohydantoin.

Since certain changes may be made in the above invention and different embodiments of the invention may be made without departing from the scope thereof, it is intended that all matter contained in the disclosure shall be interpreted as illustrative and not in a limiting sense.

I claim as my invention:

1. An aqueous electroplating electrolyte comprising as its essential ingredients copper sulfate, sulfuric acid, and from 0.005 to 0.2 ounce per gallon of yeast protein autolysate comprising the digest resulting from yeast acted upon by proteolytic enzymes naturally present therein, said digest being completely soluble and comprising soluble nitrogen compounds.

2. An aqueous electroplating electrolyte comprising as its essential ingredients copper sulfate, sulfuric acid, from 0.005 to 0.2 ounce per gallon of yeast protein autolysate comprising the digest resulting from yeast acted upon by proteolytic enzymes naturally present therein, said digest being completely soluble and comprising soluble nitrogen compounds, and from 0.003 to 0.2 ounce per gallon of a starch saccharifying enzyme.

3. An aqueous electroplating electrolyte comprising as its essential ingredients copper sulfate, sulfuric acid, from 0.005 to 0.2 ounce per gallon of yeast protein autolysate comprising the digest resulting from yeast acted upon by proteolytic enzymes naturally present therein, said digest being completely soluble and comprising soluble nitrogen compounds, and from 0.0005 to 0.015 ounce per gallon of at least one compound selected from the group consisting of thiourea, its derivatives, and cyclics having the thiourea nucleus:

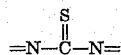

4. An aqueous electroplating electrolyte comprising as its essential ingredients copper sulfate, sulfuric acid, from 0.005 to 0.2 ounce per gallon of yeast protein autolysate comprising the digest resulting from yeast acted upon by proteolytic enzymes naturally present therein, said digest being completely soluble and comprising soluble nitrogen compounds, from 0.003 to 0.2 ounce per gallon of a starch saccharifying enzyme, and from 0.0005 to 0.015 ounce per gallon of at least one compound selected from the group consisting of thiourea, its derivatives, and cyclics having the thiourea nucleus:

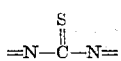

5. In the method of plating on a base copper from an aqueous electrolyte, the electrolyte comprising as its essential ingredients copper sulfate and sulfuric acid, the steps comprising adding to the electrolyte from 0.005 to 0.2 ounce per gallon of yeast protein autolysate comprising the digest resulting from yeast acted upon by proteolytic enzymes naturally present therein, said digest being completely soluble and comprising soluble nitrogen compounds and then passing a plating electrical current from an anode through the electrolyte and to the base to deposit copper on the base.

6. In the method of plating on a base copper from an aqueous electrolyte, the electrolyte comprising as its essential ingredients copper sulfate and sulfuric acid, the steps comprising adding to the electrolyte from 0.005 to 0.2 ounce per gallon of yeast protein autolysate comprising the digest resulting from yeast acted upon by proteolytic enzymes naturally present therein, said digest being completely soluble and comprising soluble nitrogen compounds, from 0.003 to 0.2 ounce per gallon of a starch saccharifying enzyme, and then passing a plating electrical current from an anode through the electrolyte and to the base to deposit copper on the base.

7. In the method of plating on a base copper from an aqueous electrolyte, the electrolyte comprising as its essential ingredients copper sulfate and sulfuric acid, the steps comprising adding to the electrolyte from 0.005 to 0.2 ounce per gallon of yeast protein autolysate comprising the digest resulting from yeast acted upon by proteolytic enzymes naturally present therein, said digest being completely soluble and comprising soluble nitrogen compounds, from 0.005 to 0.015 ounce per gallon of at least one compound selected from the group consisting of thiourea, its derivatives, and cyclics having the thiourea nucleus:

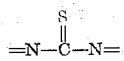

and then passing a plating electrical current from an anode through the electrolyte and to the base to deposit copper on the base.

8. In the method of plating on a base copper from an aqueous electrolyte, the electrolyte comprising as its essential ingredients copper sulfate and sulfuric acid, the steps comprising adding to the electrolyte from 0.005 to 0.2 ounce per gallon of yeast protein autolysate comprising the digest resulting from yeast acted upon by proteolytic enzymes naturally present therein, said digest being completely soluble and comprising soluble nitrogen compounds, from 0.003 to 0.2 ounce per gallon of a starch saccharifying enzyme, from 0.0005 to 0.015 ounce per gallon of at least one compound selected from the group consisting of thiourea, its derivatives, and cyclics having the thiourea nucleus:

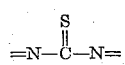

and then passing a plating electrical current from an anode through the electrolyte to the base to deposit copper on the base.

References Cited in the file of this patent

UNITED STATES PATENTS

| | | |
|---|---|---|
| 868,729 | Trunkhahn | Oct. 22, 1907 |
| 2,391,289 | Beaver | Dec. 18, 1945 |
| 2,703,311 | Alexander | Mar. 1, 1955 |
| 2,733,198 | Nobel et al. | Jan. 31, 1956 |

FOREIGN PATENTS

| | | |
|---|---|---|
| 461,186 | Canada | Nov. 22, 1949 |
| 892,991 | Germany | Oct. 12, 1953 |